June 22, 1948.   H. W. ALDEN   2,443,590
AXLE CONSTRUCTION
Filed Sept. 19, 1941
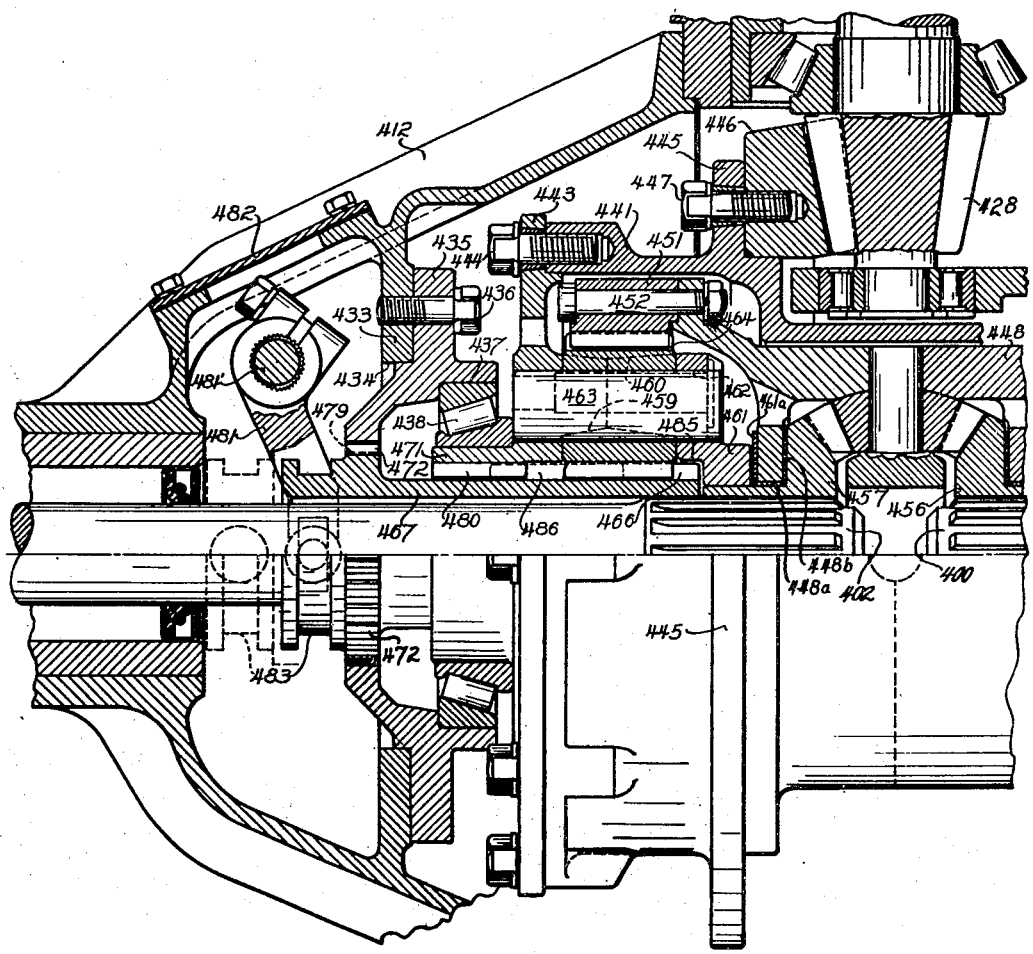
Inventor
Herbert W. Alden
By Strauch & Hoffman
Attorneys Patented June 22, 1948

2,443,590

UNITED STATES PATENT OFFICE 2,443,590

AXLE CONSTRUCTION

Herbert W. Alden, Detroit, Mich., assignor to The Timken-Detroit Axle Company, Detroit, Mich., a corporation of Ohio Application September 19, 1941, Serial No. 411,602

3 Claims. (Cl. 74—314)

This invention relates to axle constructions, and more particularly to planetary multi-speed axle mechanisms.

In the automotive field, and especially that concerned with load bearing vehicles such as trucks, etc., there is an increasing demand for multi-speed axle constructions primarily two-speed axles, which are efficient in operation, durable and serviceable in use, and which provide suitable speed ratios, both for faster driving, under light loads or empty conditions, as well as for low speed driving, under loaded conditions. In an effort to meet this demand, many kinds of multi-speed axles have been proposed, principal of which is probably the planetary two-speed axle. Prior devices of this general character are well-known in the art, and while satisfying some of the mentioned requirements of the trade, fail to meet with complete and entire satisfaction, due principally to the fact that the size of the axle is prohibitive, its efficiency is low, it is of such complicated character to be difficult to assemble and expensive to produce, requiring special types of housings or other special parts, or lubrication is faulty.

Also, with axle makers who market both types of axles, that is, a single speed and a multi-speed planetary type, a further practical problem is presented, as the two types, as formerly made, are so radically different in construction that two complete sets of parts, one for each type of axle, had to be manufactured and kept in stock. This, of course, involved considerable extra expense and increased the price of both of these types of axles.

Accordingly, it is the major object of this invention to provide an improved type of multi-speed planetary axle construction which has a high speed ratio overdrive for light loads, and a low speed ratio direct drive for heavier service which is not materially increased in size over a standard single speed axle of equivalent capacity and ratio.

More specifically, it is an object to provide an improved axle construction of the planetary overdrive type embodying ring and pinion gears of the hypoid type, whereby a direct low-speed drive, affording a sufficiently low speed ratio, is obtained, without materially increasing the overall size of the axle.

Another object is to provide, in a multi-speed axle construction, a novel planetary gear assembly which is so designed as to render them adequately strong to withstand the most severe service conditions.

Another object is the provision of a novel multi-speed axle construction of simplified form and embodying a minimum number of parts.

The foregoing, and other ancillary objects, will become apparent from the following detailed description of a preferred embodiment of my invention, when considered with the appended claims and accompanying drawing, wherein the single view is a fragmentary horizontal section of a multi-speed axle, illustrating the essential elements of the present invention.

The embodiment of the invention selected for illustration includes an auxiliary housing 412 which is provided with a transverse interior web member 433 bored to provide a seat 434 for a combined bearing carrier member and clutch locking element 435, bolted to web 433 by screws 436 as shown. Element 435 has a bearing recess 437 receiving the outer race of the taper roller bearing 438.

A housing member indicated generally at 441 has bolted to it, by screws 444, a cover element 443, which has a projecting portion 471 seated in the inner race of bearing 438. Member 441 has an exterior flange 445 for attachment of a hypoid ring gear 446, meshing with the hypoid pinion 428. The ring gear is attached to the housing member 441 by means of screws, 447, bolts and nuts, or any equivalent.

A differential carrier member 448 is journaled at its right end and near its mid-portion upon the shoulders of side gears 456 and 457. Inserts 448a and 448b of bronze or the like provide bearing means between the carrier and the side gear. An internal ring gear 451 is secured to the left end of the carrier member by means of bolts 452. The carrier is split, and carries pinions engaging the side gears 456 and 457, splined on the axle shafts 400 and 402, respectively.

The cover element is provided adjacent its inner portion with a circular series of bosses 459, and seated on these bosses is a corresponding series of bosses 460 carried by a ring member 461. Screws 462 pass through these bosses and are threaded into cover element 443, so that the ring element is rigidly fixed to cover element 443. Inserts 461a of bronze or the like, provide bearing means between the ring member 461 and the carrier member 448.

Pins 463, pressed in aligned openings in the cover and ring elements 443 and 461, provide trunnion elements on which planet gears 464 are journaled.

An elongated quill or sleeve member 467 has elongated sun gear teeth 466 on its right end portion adapted to float between and engage the planet gears 464. The quill is shiftable to the left so that the sun gear can simultaneously engage the internal teeth 480 on the projecting portion 471 of the cover element 443. Near its left end the quill has external clutch teeth 472, adapted to engage the internal clutch teeth 479 on the left end of the clutch locking and bearing supporting element 435.

Any desired means may be used to facilitate the engagement of sun gear teeth 466 with the internal teeth 480, and of the clutch teeth 472 with the cooperating teeth 479. If desired, the means used may be those described in the application of Nelson R. Brownyer, Serial No. 387,977, filed April 10, 1941, now abandoned.

A clutch yoke 481 is adjustably mounted on shaft 481′, journaled in the housing 412. A cover plate 482 is provided to afford access to these parts. The clutch yoke 481 engages a groove 483 in quill 467, so that when the yoke is moved the quill 467 is shifted to the left or right. The leftmost positions of the yoke and quill are indicated in dotted lines.

The sun gear teeth 466 are longer than the planet gear teeth. When the quill 467 is in its extreme right position, as shown in the drawing, the sun gear teeth project partially into a recess 485 in the ring member 461, and the remainder of the length of the sun gear teeth are in engagement along the full length of the planet gear teeth. At the same time, the clutch teeth 472 on the quill and the cooperating teeth 479 on the clutch locking element are in full engagement.

A similar recess 486 in the cover element is in alignment with and opposed to the recess 485. The depth of recess 486 is slightly greater than the length of the clutch teeth 479, so that when the yoke shifts the quill to the left, the teeth 472 and 479 will disengage before the sun gear teeth 466 engage with the internal teeth 480.

In the operation of the illustrated embodiment of the invention the sleeve or quill 467 is axially shifted from left to right and vice versa in order to lock or unlock the sun gear against rotation about its axis. When the sun gear is locked to the stationary housing an overdrive is provided, and when it is locked to the rotating differential carrier member 441, the differential carrier and pinion gears are driven at the same speed as the differential carrier.

In this preferred embodiment the ring member 461 directly supports side gear 457, and the latter directly supports the left hand end of housing 448. This results in a stronger assembly and yet makes it unnecessary to support any of the parts upon the quill. The sleeve or quill is more strongly supported, by reason of sun gear 466 riding upon the pitch lines of the planets, with which it is meshed in all shifted positions of the sleeve.

By making the sun gear 466 longer than the planet gears 464, the sun gear engages the planet gear along the full length of the planet gears when the sun gear is held stationary and the planet gears are revolving in meshing engagement around it. It is important to have engagement of the sun gear along the length of the planet gear under those conditions of operation, so that the wear on the planet gears is evenly distributed.

From the foregoing, it will be apparent that my improved axle construction results in marked economies in production time and labor. My novel two-speed axle is highly efficient, yet compact and of minimum size and weight for the low speed ratios obtained. Also, assembly is materially facilitated by my improved construction and the rigid mountings of the planet gears and sun gear sleeves enhance the serviceability and life of the axle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a housing; a planetary rotor journalled in said housing and having a hub provided with internal teeth, and supporting a plurality of planet gears for rotation about axes spaced from the axis of said rotor; a casing rotatable in said rotor and having an orbit gear constantly meshing with said planet gears; a set of stationary locking teeth provided in said housing and concentrically disposed with respect to the axis of said rotor; an axially shiftable sleeve-like member projecting through the hub of said rotor and carrying a sun gear constantly meshing with said planet gears and having clutch teeth meshable with said stationary locking teeth, the neighboring ends of said planet gears and said internal teeth in said rotor being axially spaced apart a predetermined distance, and said sleeve-like member being movable from a position where its clutch teeth are in engagement with the locking teeth of said housing, through an intermediate position wherein said clutch teeth are disengaged from said stationary locking teeth into a third position where said sun gear is meshed with the internal teeth of said rotor as well as with said planet gears, said sun gear teeth having an axial length which is materially greater than the axial length of said planet gear teeth and which is slightly less than the combined axial length of the teeth of said planet gears and the spacing between the latter and the internal teeth of said rotor.

2. The axle construction defined in claim 1, wherein the axial spacing of said internal rotor teeth and said planet gear teeth is substantially equal to the axial length of said stationary locking teeth, and said sun gear teeth are adapted to project into said space out of contact with said internal teeth when said sleeve is shifted into said intermediate position to bring the clutch teeth thereof out of mesh with the stationary locking teeth of said housing.

3. The axle construction defined in claim 1, wherein an axle shaft is rotatably mounted in said housing and projects through said sleeve-like member, and the latter is disposed out of journalling engagement with said shaft and said rotor in all shifted positions thereof, and is supported by its sun gear constantly riding on the pitch lines of the planet gears.

HERBERT W. ALDEN.

REFERENCES CITED

The following references are of record in the file of this patent:

UNITED STATES PATENTS

| Number | Name | Date |
|---|---|---|
| 1,497,845 | Evans | June 17, 1924 |
| 1,527,335 | Uppercu | Feb. 24, 1925 |
| 1,623,212 | Starr | Apr. 5, 1927 |
| 1,744,179 | Tibbetts | Jan. 21, 1930 |
| 1,770,314 | Lancia | July 8, 1930 |
| 1,775,926 | Barbarou | Sept. 16, 1930 |
| 1,815,688 | Wiedmaier | July 21, 1931 |
| 1,882,033 | Pirinoli | Oct. 11, 1932 |
| 1,946,051 | Alden | Feb. 6, 1934 |
| 1,964,956 | Lincoln | July 3, 1934 |
| 2,015,108 | Harper | Sept. 24, 1935 |
| 2,053,929 | Wiedmaier | Sept. 8, 1936 |
| 2,056,303 | Starr | Oct. 6, 1936 |
| 2,056,881 | Alden | Oct. 6, 1936 |
| 2,068,438 | Starr | Jan. 19, 1937 |
| 2,088,599 | Johnson | Aug. 3, 1937 |
| 2,142,575 | Spicacci | Jan. 3, 1939 |
| 2,147,146 | Carlson | Feb. 14, 1939 |
| 2,178,900 | Starr | Nov. 7, 1939 |
| 2,225,720 | Snow | Dec. 24, 1940 |
| 2,242,519 | Frank | May 20, 1941 |